(12) United States Patent
Tanaka et al.

(10) Patent No.: US 10,592,352 B1
(45) Date of Patent: Mar. 17, 2020

(54) BACKUP SYSTEM

(71) Applicant: Hitachi, Ltd., Tokyo (JP)

(72) Inventors: Naoki Tanaka, Tokyo (JP); Goro Kazama, Tokyo (JP); Naoyuki Masuda, Tokyo (JP); Tomoya Yamada, Tokyo (JP); Yuri Hiraiwa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/531,261

(22) Filed: Aug. 5, 2019

(30) Foreign Application Priority Data

May 16, 2019 (JP) .................................. 2019-092938

(51) Int. Cl.
*G06F 11/14* (2006.01)
*G06F 21/56* (2013.01)
*G06F 16/11* (2019.01)

(52) U.S. Cl.
CPC ...... *G06F 11/1464* (2013.01); *G06F 11/1451* (2013.01); *G06F 11/1469* (2013.01); *G06F 16/113* (2019.01); *G06F 21/565* (2013.01)

(58) Field of Classification Search
CPC ............. G06F 11/1464; G06F 11/1451; G06F 11/1469; G06F 16/113; G06F 21/565
See application file for complete search history.

(56) References Cited

U.S. PATENT DOCUMENTS

| 5,978,779 | A  | * | 11/1999 | Stein ...................... G06Q 40/04 705/37 |
| 9,405,756 | B1 |   | 8/2016  | Xavier et al. |
| 2005/0076264 | A1 | * | 4/2005  | Rowan ................ G06F 11/1469 714/6.12 |
| 2017/0255524 | A1 | * | 9/2017  | McGrath ............. G06F 11/1451 |
| 2018/0089041 | A1 | * | 3/2018  | Smith .................... G06Q 20/00 |
| 2018/0322161 | A1 | * | 11/2018 | Horii ................... G06F 11/1451 |

* cited by examiner

*Primary Examiner* — Ramon A. Mercado
(74) *Attorney, Agent, or Firm* — Mattingly & Malur, PC

(57) ABSTRACT

Provided is a backup system including a storage system and a backup server, in which the backup server includes a ledger for managing a copy number and a backup acquisition date and time for each backup image, a data volume that stores data accessed by a business server, a backup image volume that stores a plurality of backup images at different time points of the data volume, an access volume having a volume ID for accessing the backup image from the backup server, and a data protection area including at least one volume having an internal volume ID instead of the volume ID for accessing from the backup server are configured in the storage system, and the backup image stored in the data protection area and the access volume are associated, and the backup image in the data protection area is provided to the backup server.

6 Claims, 11 Drawing Sheets

F I G. 1
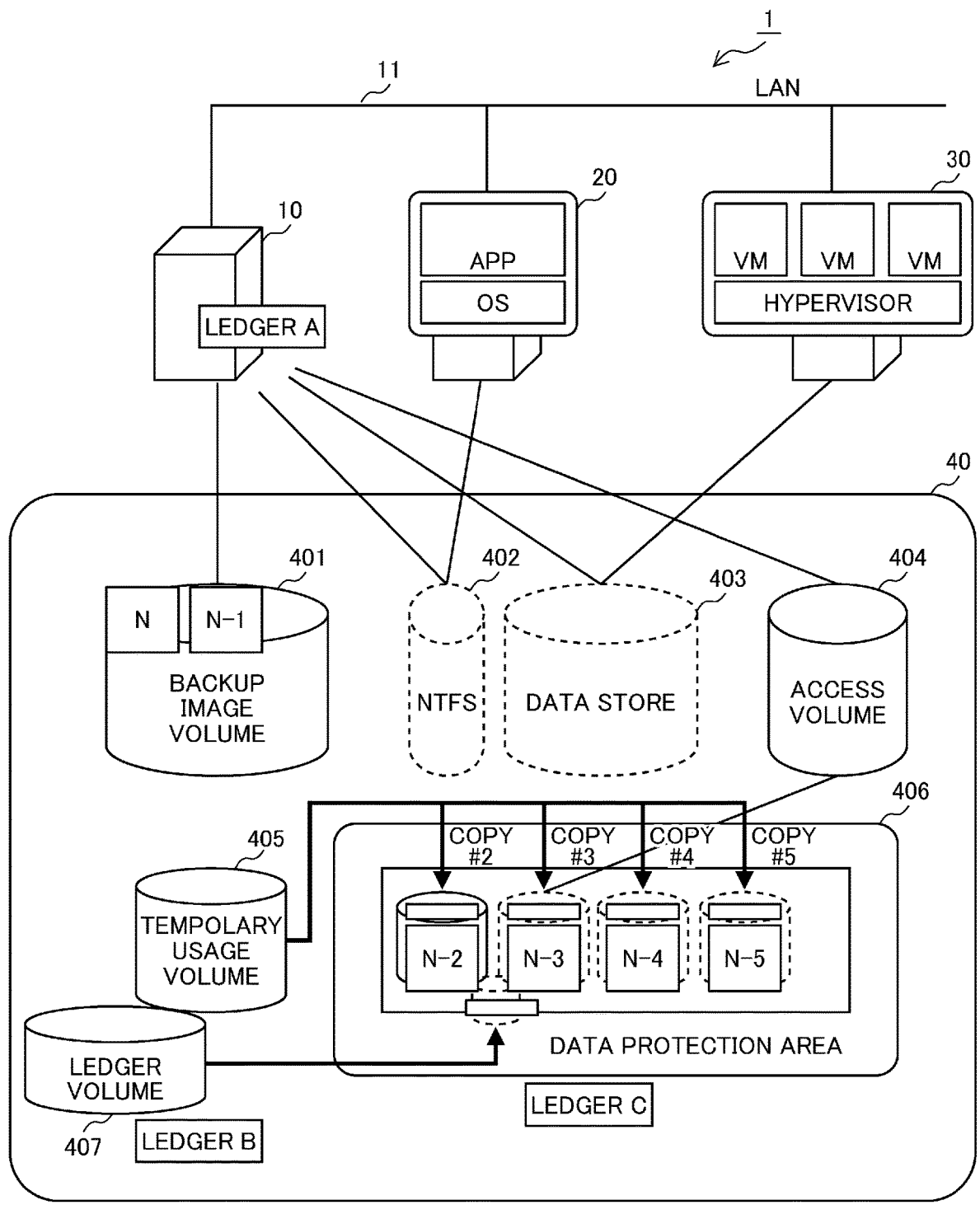

FIG. 3

MANAGEMENT LEDGER TABLE T1
106

| NAME | COPY NUMBER | BACKUP IMAGE ID | BACKUP DATE AND TIME | COPY ACQUISITION DATE AND TIME A |
|---|---|---|---|---|
| BACKUP IMAGE 1 | 3 | BK_20190304 | 2019/3/4 00:00:00 | 2019/3/4 01:00:00 |
| BACKUP IMAGE 2 | 4 | BK_20190305 | 2019/3/5 00:00:00 | 2019/3/5 01:00:00 |
| ... | | | | |

MANAGEMENT METHOD SETTING TABLE T2
107

| NAME | MAXIMUM OF NUMBER OF DATA HOLDING GENERATIONS | BACKUP POLICY |
|---|---|---|
| SETTING 1 | 10 | DATA IS MOVED TO DATA PROTECTION AREA WHEN ALL FOLLOWING CONDITIONS ARE SATISFIED<br>・BACKUP IS NEWLY GENERATED ON BACKUP SOFTWARE SIDE<br>・MAXIMUM OF NUMBER OF HOLDING GENERATIONS ON BACKUP SOFTWARE SIDE IS REACHED |

T21, T22, T23

F I G. 5

CONFIRMATION RESULT TABLE T3
108

| BACKUP IMAGE ID | DATA CHECK DATE AND TIME (NOT CHECKED IF EMPTY) | CHECK RESULT |
|---|---|---|
| BK_20190304 | 2019/9/4 01:00:00 | INFECTED |
| BK_20190305 | 2019/9/4 02:00:00 | RESTORE CANDIDATE |
| ... | | |

T31, T32, T33

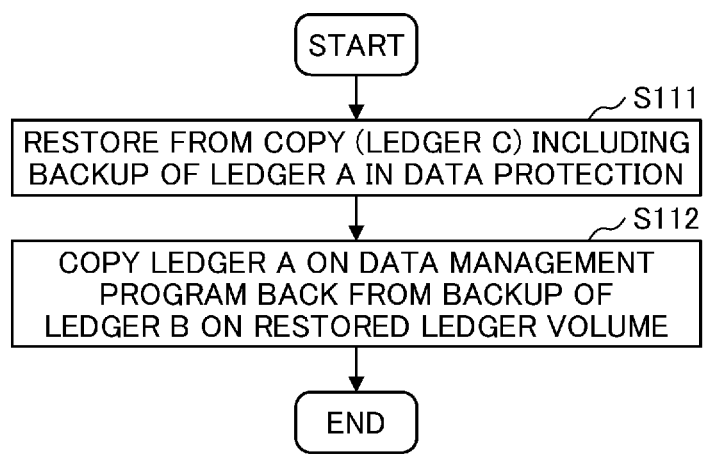
F I G. 1 1

BACKUP SYSTEM

CROSS-REFERENCE TO RELATED APPLICATION

The present application claims priority from Japanese application JP 2019-092938, filed on May 16, 2019, the contents of which is hereby incorporated by reference into this application.

BACKGROUND OF THE INVENTION

1. Field of the Invention

The present invention relates to a data backup technology.

2. Description of the Related Art

With the diversification of cyber attacks, the rate at which anti-virus software or the like can detect new types of malware is decreasing year by year. Further, the cyber attack is advanced, and destruction of service (DeOS) type attacks or the like that destroys even a backup are emerging.

In this regard, the technology is transitioning to a concept of "cyber resilience" which detects activation/expression of malware and copes with it on the premise that it is invaded while preventing an invasion of malware.

In the backup system of the related art, it is likely that all pieces of backup data are infected by the DeOS type attack or the like and become a situation that they are unable to be restored. Also, even if there is uninfected backup data, it is necessary to manually check the backup one by one and determine a restore point. In the cyber resilience, since the backup data is acquired more than ever before, a time to decide the restore point and restore them is considered to increase dramatically.

As a data protection technique, a technique for storing a plurality of generations of backup images in a cloud is disclosed in U.S. Pat. No. 9,405,756.

According to U.S. Pat. No. 9,405,756, it is possible to restore original data from a plurality of generations of backup images, but if backup software and a program operating on a server allowed to access to a storage system which is a storage destination of the backup images so that the backup software operates are infected with virus or the like, all the backup images are destroyed, and thus restoration to corrected data is unable to be performed.

SUMMARY OF THE INVENTION

In this regard, it is an object of the present invention to provide a backup system capable of performing restoration to corrected data even when the backup software is infected with virus.

In order to achieve the above object, one aspect of a backup system of the present invention is a backup system including a storage system and a backup server, in which the backup server includes a ledger for managing a copy number and a backup acquisition date and time for each backup image, a data volume that stores data accessed by a business server, a backup image volume that stores a plurality of backup images at different time points of the data volume, a primary usage volume that stores an oldest backup image among the plurality of backup images, a ledger volume that stores a copy of the ledger of the backup server, an access volume having a volume ID for accessing the backup image from the backup server, and a data protection area including at least one volume having an internal volume ID instead of the volume ID for accessing from the backup server are configured in the storage system, the oldest backup image stored in the primary usage volume and an entry including the backup acquisition date and time corresponding to the oldest backup image stored in the primary usage volume in the ledger stored in the ledger volume are sequentially stored in the volume of the data protection area using the internal volume ID of the volume of the data protection area, and the backup image stored in the data protection area and the access volume are associated, and the backup image in the data protection area is provided to the backup server.

According to the present invention, it is possible to prevent destruction or falsification of backup data including the DeOS type attack.

BRIEF DESCRIPTION OF THE DRAWINGS

FIG. 1 is a configuration diagram of an information processing system of an embodiment;

FIG. 3 is a diagram illustrating an example of a management ledger table of an embodiment;

FIG. 4 is a diagram illustrating an example of a management method setting table of an embodiment;

FIG. 5 is a diagram illustrating an example of a confirmation result table of an embodiment;

FIG. 11 is a flowchart illustrating a process of restoring a ledger in a data protection area by a data protection area management program of an embodiment.

DETAILED DESCRIPTION OF THE PREFERRED EMBODIMENTS

Figure 2:
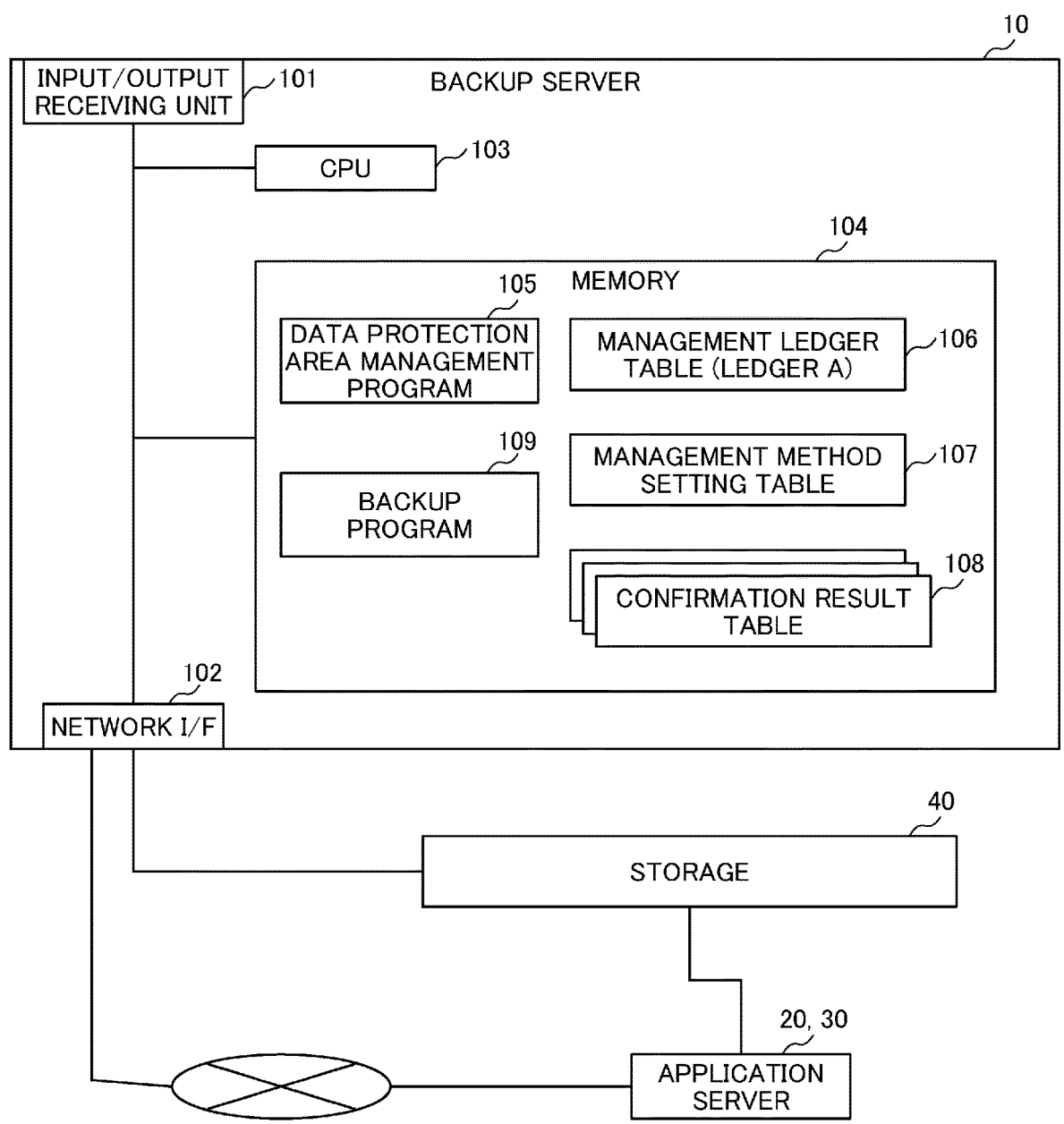
FIG. 2 is a hardware block diagram of a backup server of an embodiment.

An exemplary embodiment will be described with reference to the appended drawings. Note that an embodiment to be described below does not limit the invention related to claims set forth below, and all of elements described in an embodiment and combinations thereof are not intended to be essential for the solutions of the invention.

In the following description, there are cases in which information is described by an expression [AAA table], but information may be expressed by any data structure. That is, the [AAA table] can be written as [AAA information] to indicate that information does not depend on a data structure.

Also, in the following description, a processor is typically a central processing unit (CPU). The processor may include a hardware circuitry that performs some or all of processes.

Also, in the following description, there are cases in which a [program] is described an entity of an operation, but since the program is executed by the processor to perform a predetermined process appropriately using a storage resource (for example, a memory), an actual entity of the process is the processor. Therefore, the processing in which the program is described as the entity of the operation may be a process performed by a device including a processor. Further, a hardware circuitry that performs some or all of processes performed by the processor may be included.

A computer program may be installed in a device from a program source. The program source may be, for example, a program distribution server or a computer readable storage medium.

Embodiment

<1. System Configuration>

FIG. 1 is a block diagram illustrating an example of an information processing system according to the present embodiment.

An information processing system 1 includes a backup server 10, one or more business servers 20 and 30 connected to the backup server 10 via a LAN 11, and one or more storage systems 40 receiving an input output (IO) request from the business servers 20 and 30 via a storage area network (SAN). The storage system 40 is connected to the backup server 10 via the LAN 11. The business server 20 operates an application (APP) on operating software (OS), and the business server 30 is a server in which a plurality of virtual machines operates on a hypervisor.

The storage system 40 has a data store 403 or an NTFS 402 that provides a storage area to the business servers. Here, in order to simplify the description, data backed up by the backup server 10 will be described using a volume (data volume) included in the data store 403 as an example. The storage system 40 has a function of acquiring a snapshot of a data volume, for example, as a function of generating a backup image of the data store 403 or the NTFS 402. However, a target to be backed up may be a file or a file system stored in the data store 403 or the NTFS 402.

Further, a data protection area 406 of an area which is unable to be accessed directly from the outside such as the backup server 10 and the business servers 20 and 30 and a plurality of volumes corresponding to a function thereof are configured in the storage system 40.

A plurality of volumes includes a backup image volume 401 that stores a plurality of backup images of a volume to be backed up, an access volume 404 used when the backup volume is read from the data protection area 406, a temporary usage volume 405 which is temporarily used to store the backup image stored in the backup image volume 401 in the data protection area 406, and a ledger volume 407 which is temporarily used when a ledger managed by the backup server 10 is stored in the data protection area 406.

The backup image is, for example, backup data or snapshot data of the volume of the data store 403 and is data at a different time point (a plurality of generations) of a volume serving as a backup target. Here, the backup target may be a file or a file system other than the volume.

In order to describe a function of each volume, an example of the flow of data is briefly described.

In the backup server 10, a backup program 109 operates to acquire the backup of the volume of the data store 403 and stores it in the backup image volume 401. A plurality of generations, for example, a generation N−1 and a generation N, of backup images at different time points for one volume which is a backup target are stored in the backup image volume 401.

The temporary usage volume 405 is used when the backup image stored in the backup image volume 401 is stored in the data protection area 406. The backup image of the temporary usage volume 405 and the ledger for managing the backup image are copied to the data protection area 406. This copy operation is performed using an internal volume ID specifying the volume in the data protection area 406. The internal volume ID is information managed in the storage system 40 and is not provided to external devices such as the backup server and the business servers 20 and 30, and the external devices are unable to access the volume in the data protection area using the internal volume ID. A volume ID allocated to the volume is used when accessing the volume in the storage system 40 from the external device.

The backup image stored in the data protection area 406 is associated with the access volume 404 having the volume ID so that the backup server 10 can use it.

That is, the data protection area 406 which is unable to be accessed directly from the external devices is configured by assigning the internal volume ID used for the volume management in the storage system 40 to the volume in the data protection area 406 without assigning the volume ID for access from the outside.

In the present embodiment, the storage system 40 is described as having these functions. That is, a microprogram that controls the operation of the storage system 40 executes such functions on the basis of an external instruction. However, a program with a storage function may realize these functions.

FIG. 2 is a hardware block diagram of the backup server 10.

A CPU 103 is hardware that controls the operation of the entire backup server 10. Further, a memory 104 is constituted by, for example, a semiconductor memory such as a synchronous dynamic random-access memory (SDRAM) and is used to store and hold necessary programs (including an operating system (OS)) and data. The memory 104 is a main memory of the CPU 103, and stores a program (a data protection area management program or the like) executed by the CPU 103 and various types of tables or the like referred to by the CPU 103 and is also used as a disk cache (a cache memory) of the backup server 10.

Some or all of processes performed by the CPU 103 can also be realized by dedicated hardware such as an application specific integrated circuit (ASIC) or a field-programmable gate array (FPGA).

Although not illustrated, the backup server 10 includes a storage device constituted by various types of drives such as a solid-state drive (SSD), a serial ATA (SATA), and a fibre channel (FC).

An input/output receiving unit 101 includes an input device such as a keyboard, a mouse, or a touch panel that receives data from an administrator and an output device such as a display device that outputs various types of data such as a data backup status for the administrator. For example, a capacity of the data protection area 406, the volume ID of the backup target, and the like are input from the administrator.

A network I/F 102 is an interface for performing various types of operations such as volume generation on the storage system 40, and is, for example, a network interface card (NIC). The network I/F 102 is connected to the application servers 20 and 30 via a network.

In addition to a data protection area management program 105, a management ledger table (ledger A) 106, a management method setting table 107, and a confirmation result table 108 for each incident are stored in the memory 104 as various types of tables. Also, a program to be executed is loaded and developed. As the program to be executed, there are the backup program 109 for acquiring a backup image with consistency by communicating with the application server and staticizing the application or the like, the data protection area management program 105 for managing storage to protect the backup image of the present embodiment, and the like.

The CPU 103 implements various types of functions by executing the data protection area management program 105 with reference to various types of management information such as the table stored in the memory 104.

<2. Various Types of Management Information>

Next, various types of management information will be described.

FIG. 3 is a diagram illustrating an example of a management ledger table of an embodiment.

If the backup program 109 on the backup server 10 acquires the backup of the volume in the data store 403, the backup image when the backup is acquired is stored in the backup image volume 401. As the backup image, back images of a plurality of generations such as the generation N−1 and the generation N are acquired depending on an acquisition timing. The generation N−1 is assumed to be a backup image which is one generation older than the generation N. In a management ledger table T1, a copy number T12 assigned by the data protection area management program 105 when copy to the data protection area 406 is performed, a backup image ID T13 assigned when the backup server 10 acquires the backup, a backup date and time T14 indicating a back acquisition timing, and a copy acquisition date and time A T15 indicating a timing at which the copy from the temporary usage volume 405 to the data protection area 406 is performed are managed in association with a name T11 of the backup image.

The respective entries of the management ledger table 106 in FIG. 3 are stored in each volume of the data protection area 406. Therefore, the internal volume ID of each volume in the data protection area 406, the copy number, and the like can be managed as corresponding information. This management ledger table T1 is stored as the ledger A of the backup server 10.

FIG. 4 is a diagram illustrating a management method setting table T2 stored in the memory 104 of the backup server 10. A maximum of the number of data holding generations T22 indicating maximum holding generations of the backup image and a backup policy T23 are managed in association with a name T21 of setting information. For example, the backup policy T23 specifies the content illustrated in FIG. 4.

FIG. 5 is a diagram illustrating a confirmation result table T3 stored in the memory 104 of the backup server 10.

A data check date and time T32 which is a time at which virus inspection of the backup image is performed and a check result T33 thereof are managed in association with a backup image ID T31. The backup image ID T31 is information corresponding to the backup image ID T13 of FIG. 3.

<3. Operation Preparation>

Operation preparation will be described with reference to FIG. 1. The following processes (A-1) to (A-9) are processed by executing the data protection area management program 105 by the CPU 103.

(A-1) A data protection area is generated in the storage system. The data protection area 406 is an area which can be accessed from a storage controller but is unable to be directly accessed from the external devices of the storage system 40, for example, the backup server 10 and the business servers 20 and 30. That is, the volume constituting the data protection area 406 is not assigned with the volume ID necessary for access and is managed by the internal volume ID used for the volume management in the storage system 40.

(A-2) The temporary usage volume 405 temporarily used when the backup image stored in the backup image volume 401 is moved to the data protection area 406 is generated.

(A-3) The generated temporary usage volume 405 and the host path of the backup server 10 are set.

(A-4) The temporary usage volume 405 is mounted on the backup server.

(A-5) The temporary usage volume 405 is registered on a management console of the backup server 10 so that the backup server 10 operates the volume temporary usage volume 405.

(A-6) The access volume 404 to be used when the backup image is read from the data protection area 406 is generated.

(A-7) The ledger volume 407 which stores the backup of the ledger A stored in the backup server 10 is generated. The backup of the ledger A stored in the ledger volume is called a ledger B.

(A-8) The generated ledger volume 407 and the host path of the backup server 10 are set.

(A-9) The ledger volume 407 is mounted on the backup server 10.

With the above process, the data protection area and a plurality of volumes with different roles can be generated on the storage system, and the backup server 10 can recognize and operate the volume 404 and the like.

<4. Operation Start>

An operation start will be described with reference to FIG. 1. The following processes (B-1) to (B-3) are processed by executing the data protection area management program 105 by the CPU 103.

(B-1) A copy group is generated in the data protection area 406. The copy group is formed using the internal volume ID to manage the generation which is the target to be backed up. The target to be backed up is the volume of the data store 403, the file system of the NTFS 402, or the like, and here, the description will proceed using the volume of the data store 403 as an example. The data protection area 406 includes a plurality of volumes, and data of each generation of the volume of the backup target is stored in each volume forming a copy group of a plurality of volumes.

(B-2) A copy pair is generated using the volume ID of the temporary usage volume 405 and an internal ID of each volume of the copy group of the data protection area 406.

(B-3) A copy pair is generated using the volume ID of the ledger volume 407 and the internal ID of the volume. A ledger copied from the ledger volume 407 to the data protection area 406 is referred to as a ledger C.

<5. Storage of Backup Image in Data Protection Area>

Figure 6:
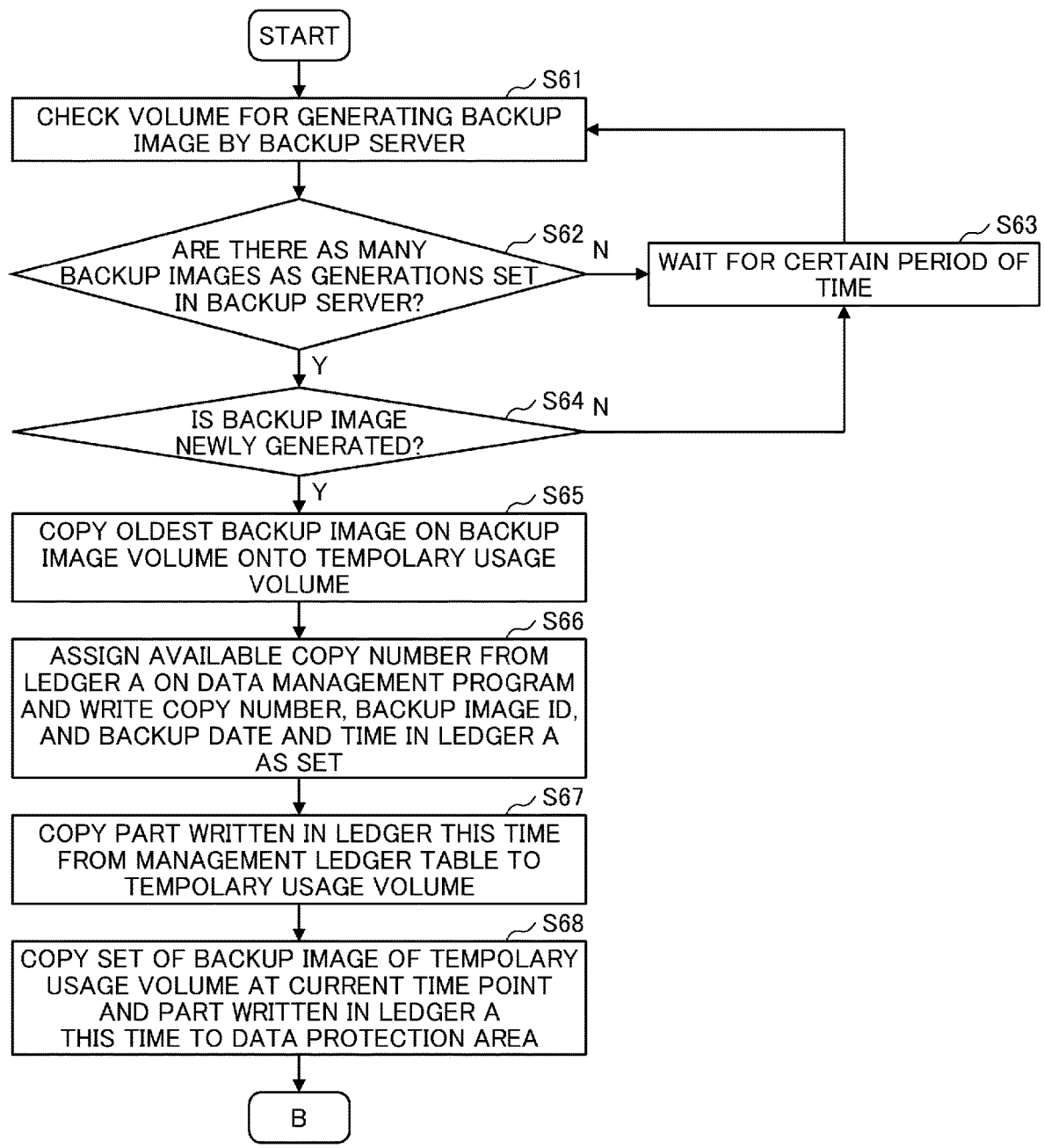
FIG. 6 is a flowchart illustrating a process of moving a backup image to a data protection area by a data protection area management program of an embodiment.

FIG. 6 is a flowchart illustrating a process of moving the backup image to the data protection area by the data protection area management program of the embodiment. The process of FIG. 6 is processed by executing the data protection area management program 105 by the CPU 103.

If the process starts, in step S61, the backup server 10 checks the volume for generating the backup image. In a case in which the backup target is a file, files in a directory are checked.

Then, in step S62, it is determined whether or not there are as many backup images as generations set in the backup program 109 of the backup server 10. If the determination result is NO, the process proceeds to step S63 and waits for a certain period of time. If the determination result is YES, the process proceeds to step S64, and it is determined whether or not a backup image is newly generated. If the determination result is NO, the process proceeds to step S63 and waits for a certain period of time. If the determination result is YES, the process proceeds to step S65.

In step S65, the oldest backup image on the backup image volume is copied to the temporary usage volume 405. In the copy process, a pairing operation is performed using the volume IDs of backup image volume 401 and the temporary usage volume 405. In the example of FIG. 1, the generation N and the generation N−1 are stored, and the generation N−1 corresponds to the oldest backup image.

In step S66, the data management program assigns an available copy number from the ledger A, and writes the copy number T12, the backup image ID T13, and the backup date and time 114 in the ledger A as a set. The copy number T12 is assigned when the copy from the temporary usage volume 405 to the data protection area 406 is performed, and the backup image in the data protection area 406 can be specified by the backup image stored in the primary usage volume and the copy number thereof.

Next, in step S67, the data protection area management program 105 copies only a part (an entry of the management ledger table) written in the ledger A this time from the management ledger table (the ledger A) 106 to the temporary usage volume 405.

Then, in step S68, the backup image of the temporary usage volume 405 at the current time point and the part written in the ledger A this time are associated as a set using the internal volume ID of the volume of data protection area, and the copy thereof is stored in the data protection area.

Figure 7:
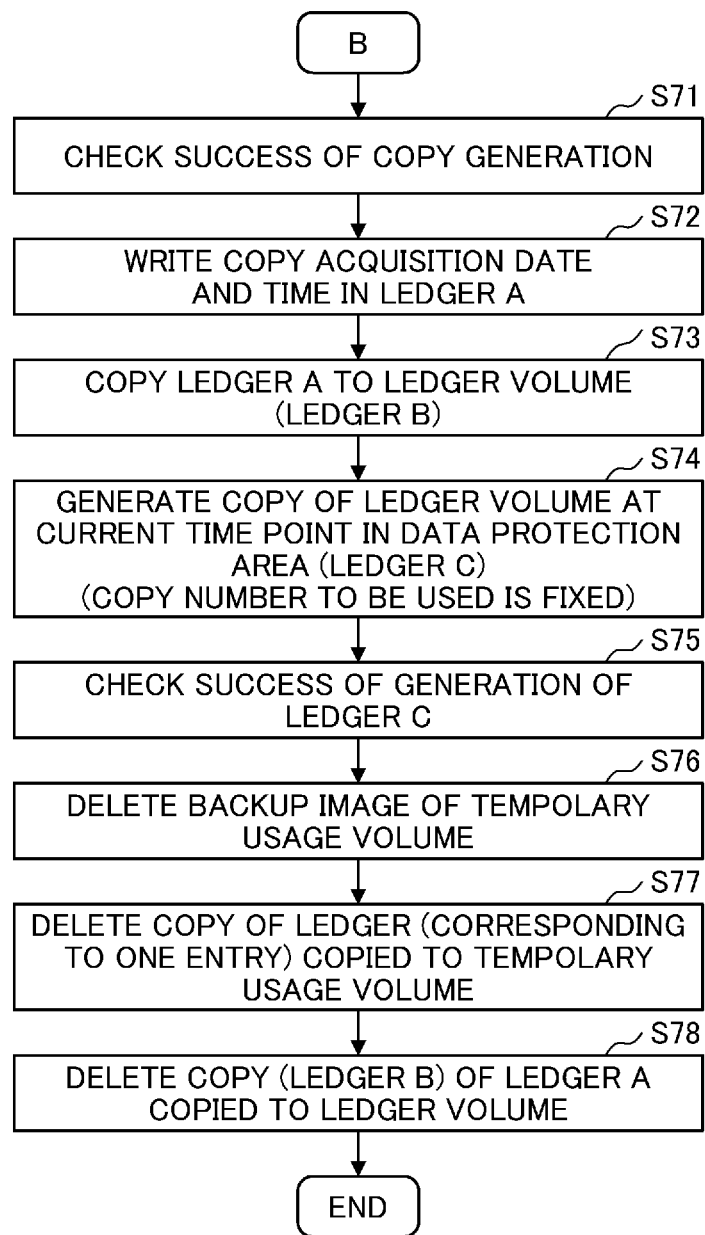
FIG. 7 is a flowchart illustrating a process of moving a backup image to a data protection area by a data protection area management program of an embodiment.

Then, the data protection area management program 105 executes the process illustrated in FIG. 7.

In step S71, the success of the copy generation executed in step S68 is checked, and in step S72, the copy acquisition date and time A T15 is written in the ledger A of the backup server 10. Now, all the entries of the management ledger table T1 illustrated in FIG. 3 are stored.

Then, in step S73, the ledger A is copied to the ledger volume 407. That is, the ledger B is stored in the ledger volume 407. In step S74, the copy of the ledger volume 407 at the current time point is generated in the data protection area 406. That is, the ledger C is stored in the data protection area 406.

In step S75, it is checked whether or not the copy of the ledger A executed in step 74 is stored in the data protection area 406. If it is checked that the copy of the ledger A is stored in the data protection area 406, that is, if it is checked that the ledger C is stored in the data protection area 406, in step S76, the backup image stored in the temporary usage volume 405 is deleted. In step S77, one entry of the ledger B stored in the temporary usage volume 405 is deleted. Here, the entry of the ledger to be deleted corresponds to the deleted backup image.

In step S78, the copy (ledger B) of the ledger copied to the ledger volume is deleted.

As described above, when the processes illustrated in FIGS. 6 and 7 are executed, the backup image stored in the backup image volume 401 and the entry of the ledger that manages it can be sequentially stored, and the ledger C which is a copy of the ledger A can be stored in the data protection area 406.

<6. Deletion of Data in Data Protection Area>

The capacity of the data protection area 406 is decided by data input by the administrator via the input/output receiving unit 101. For example, it depends on the capacity of the volume or the like of the backup target or the number of generations. Also, the frequency at which the storage system 40 is attacked by virus may be managed, and the capacity of the volume or the like of the backup target or the capacity decided by the number of generations may be multiplied by N (N is a number of 1 or more) so that the capacity of data protection area 406 is increased as the frequency is increased.

Figure 8:
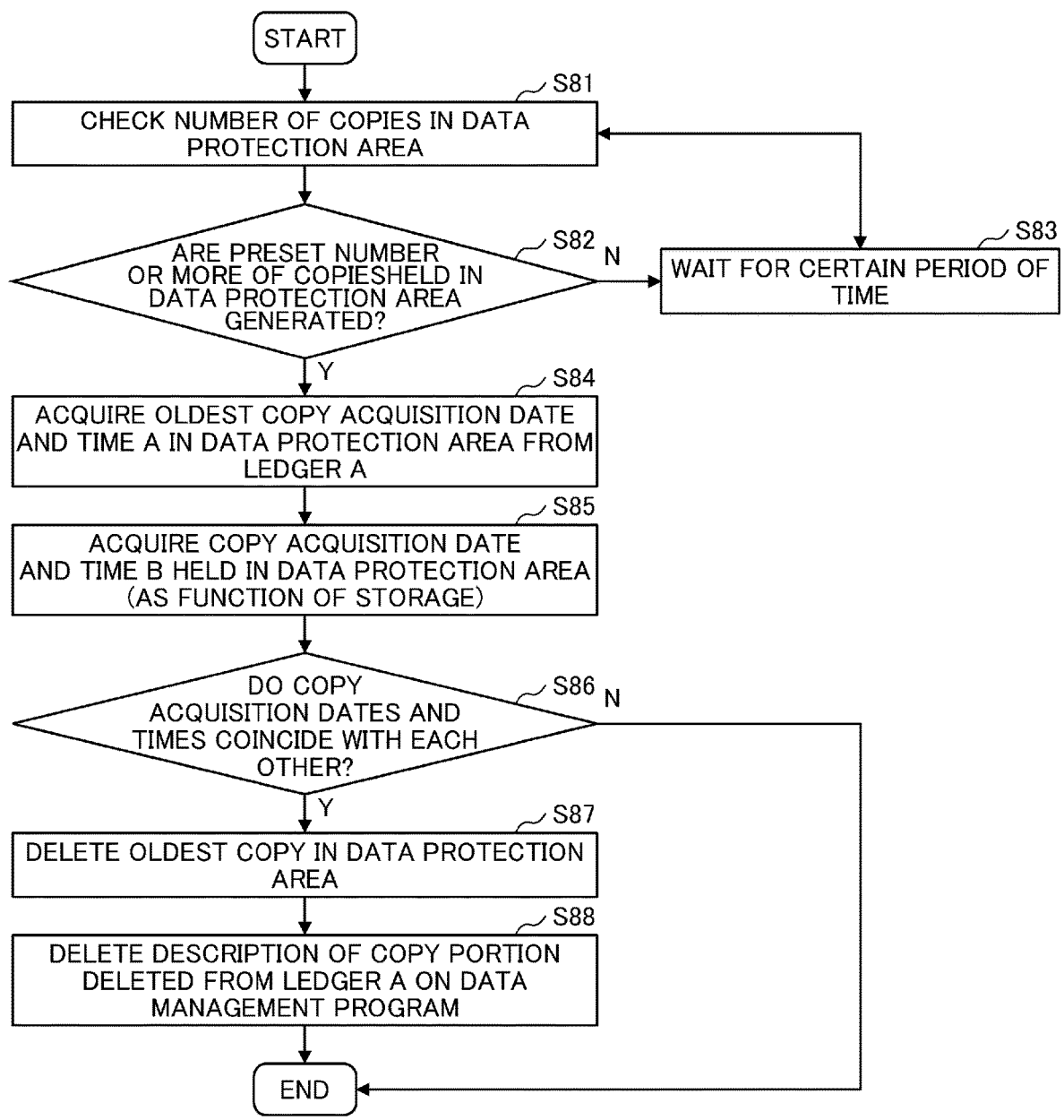
FIG. 8 is a flowchart illustrating a process of deleting data in a data protection area by a data protection area management program of an embodiment.

In any case, since the capacity of the data protection area 406 has an upper limit, it is necessary to delete unnecessary data. FIG. 8 is a flowchart illustrating a process of deleting the data in the data protection area by the data protection area management program.

In step S81, the number of copies in the data protection area is checked. The number of copies corresponds to the number of generations to be backed up in a case in which the backup target is one volume and is decided by the number of volumes or the number of volumes and the number of generations of each volume in a case in which the backup target is a plurality of volumes.

In step S82, it is determined whether or not a preset number or more of copies held in the data protection area 406 are generated. This determination is performed with reference to the value of the maximum of the number of data holding generations T22 of the management method setting table T2. If the determination result of step S82 is NO, the process proceeds to step S83 and waits for a predetermined time. If determination result is YES, the process proceeds to step S84.

In step S84, the oldest copy acquisition date and time A in the data protection area is acquired from the ledger A. Then, in step S85, the copy acquisition date and time B copied to the data protection area 406 held as a storage function is acquired.

In step S86, it is determined whether or not the copy acquisition dates and times A and B acquired in step S84 and step S85 coincide with each other. This is to check whether or not there is falsification after information is written in the ledger A on the data management program from the viewpoint of security. If the two copy acquisition dates and times do not coincide with each other, the process ends. If the two copy acquisition dates and times coincide with each other, the process proceeds to step S87.

In step S87, the oldest copy corresponding to the oldest copy acquisition dates and times A and B in the data protection area 406 are deleted, and in step S88, the description of the copy portion deleted from the ledger A on the data management program is deleted from the data protection area 406. Accordingly, when the data falsification is not performed, the data of the oldest generation can be deleted from the data protection area 406, and when there is a possibility that the two copy acquisition dates and times do not coincide with each other, and the data falsification occurs, the backup image stored in the data protection area 406 can be prevented from being deleted.

<7. Data Restore>

Figure 9:
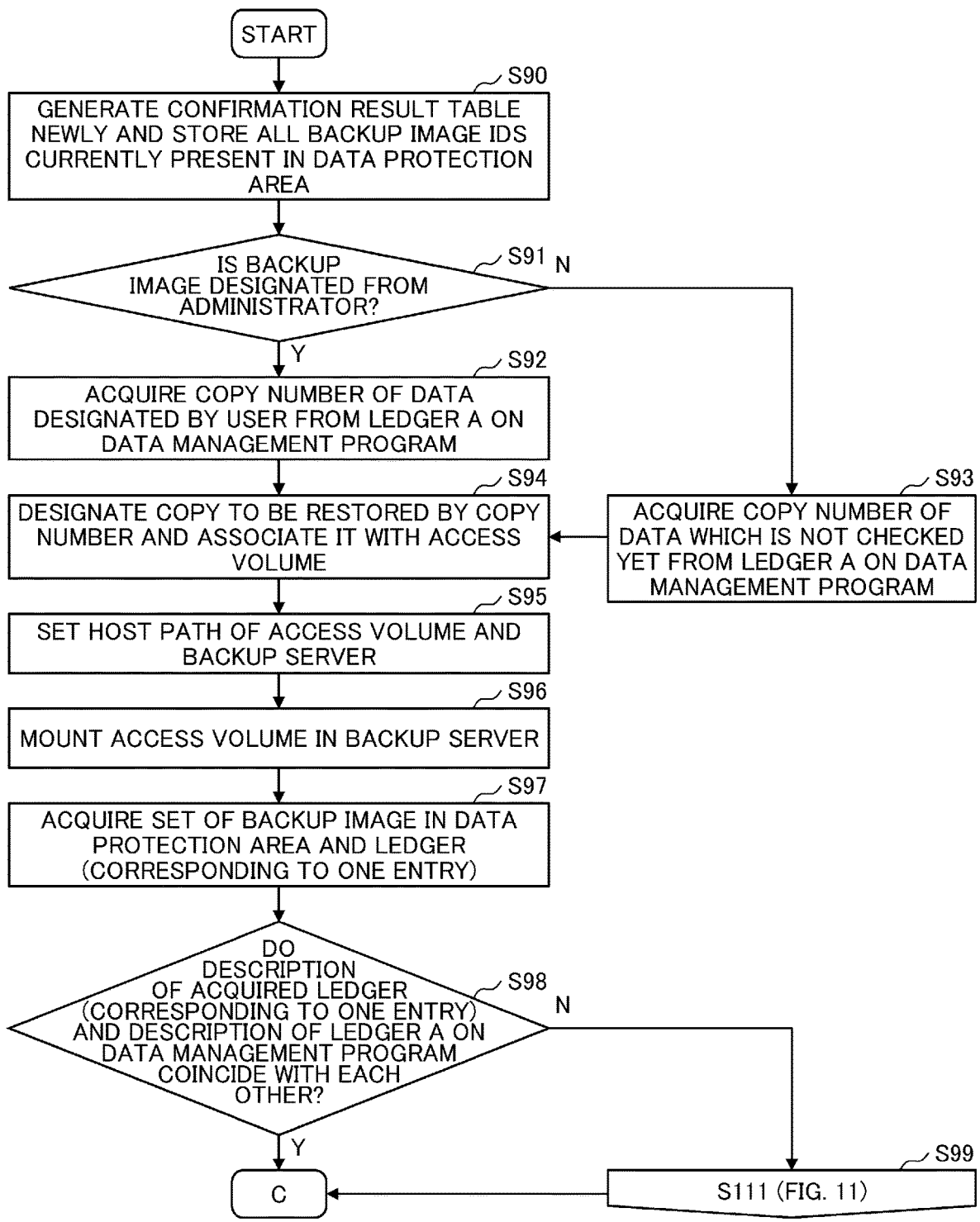
FIG. 9 is a flowchart illustrating a process of making access from a backup server possible on the basis of data in a data protection area by a data protection area management program of an embodiment.

Next, data restore using the data stored in the data protection area 406 will be described. FIG. 9 is a flowchart illustrating a process of making access from the backup server possible on the basis of the data in the data protection area by the data protection area management program.

In step S90, a confirmation result table is newly generated in the memory 104 of the backup server 10, and all the backup image IDs currently present in the data protection area 406 are read from the management ledger table (the ledger A) and stored in the generated confirmation result table.

Then, in step S91, it is determined whether or not a backup image desired to be restored is designated from the administrator. If a backup image is designated from the administrator, the process proceeds to step S92, and otherwise, the process proceeds to step S93. The designation of the backup image from the administrator is performed by the backup image name T11 or the backup image ID T13.

In step S92, the copy number T12 corresponding to the backup image of the backup image name T11 designated by the user is acquired from the ledger A on the data management program.

Then, in step S94, the copy stored in the data protection area 406 is designated by the copy number T12 and is associated with the access volume 404. This association can also be performed using the internal volume ID of the volume of data protection area that stores the backup image. In step S95, the host path of the access volume 404 and the backup server is set, and in step S96, the access volume is mounted in the backup server. Accordingly, the backup server 10 can read and check the backup image stored in the data protection area 406 by accessing the access volume 404.

Then, in step S97, a set of backup image and ledger (corresponding to one entry) in the data protection area 406 is acquired.

In step S98, it is determined whether or not the description of the ledger (corresponding to one entry) acquired in step S97 coincides with the description of the ledger A on the data management program (the value of each entry of the ledger). Since the backup image and the ledger (corresponding to one entry) in the data protection area 406 are not updated from a time point at which they are stored in the data protection area 406, it can be checked whether or not the ledger A of the backup server 10 is not altered. If they do not coincide with each other, the process proceeds to step S99 and proceeds to the flow of ledger restoration (see FIG. 11). If they do not coincide with each other, the process proceeds to step C.

In step S93, a copy number of data which is not yet checked is acquired from the ledger A on the data management program, and the process proceeds to step S94. This is to check all the copy numbers in the data protection area.

Figure 10:
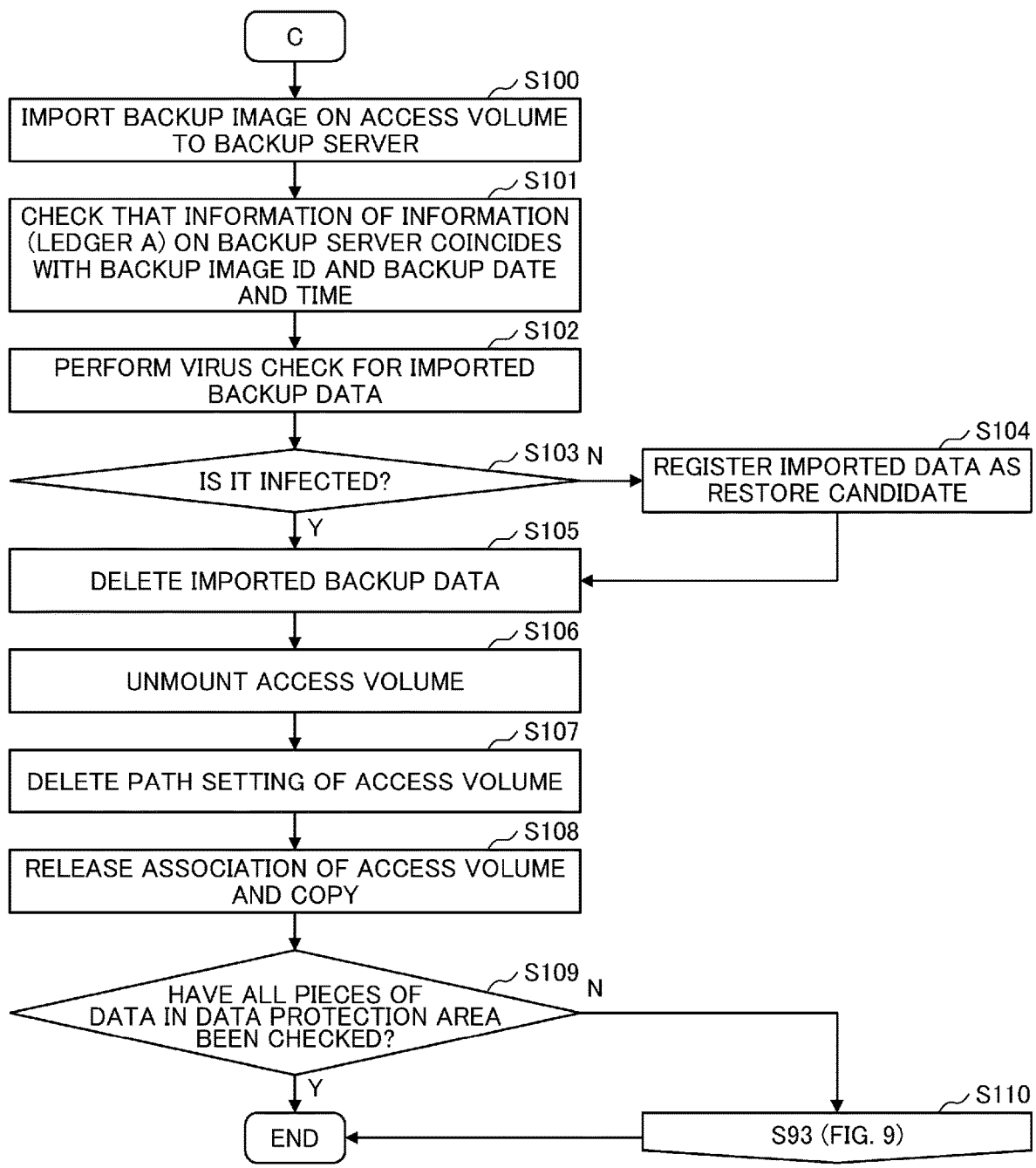
FIG. 10 is a flowchart illustrating a process of making access from a backup server possible on the basis of data in a data protection area by a data protection area management program of an embodiment.

FIG. 10 is a flowchart illustrating a process continuing from FIG. 9, that is, a process of restoring data on the basis of the data in the data protection area 406 by the data protection area management program 105.

In step S100, the backup image of the access volume 404 is imported into the backup server 10. The import means an operation of causing it to become a state in which content of the backup image can be accessed by the backup program 109.

In step S101, it is checked that information of information (the ledger A) on the backup server coincides with the backup image ID and the backup date and time read from the data protection area 406. Since the information of the data protection area is not updated, it can be checked that the ledger A of the backup server 10 is altered.

In step S102, virus check is performed for the imported backup data, and infection is checked.

In step S103, it is determined whether or not the backup image is infected, and if not infected, the process proceeds to step S104, and the imported backup image is registered in the check result T33 of the confirmation result table T3 as a restore candidate.

If it is determined that the backup image is infected or if the process of step S104 is performed, the process proceeds to step S105, and the backup data imported to the backup server 10 is deleted.

Then, in step S106, the access volume is unmounted, the path setting of the access volume is deleted (step S107), and the association between the access volume and the copy of the backup image of the data protection area 406 is released.

Then, it is determined whether or not all pieces of data in the data protection area have been checked, the process ends when all pieces of data have been checked, and when there is any one piece of data which is not checked, the process proceeds to step S110 and returns to step S93 of FIG. 9. When the backup image is designated from the administrator, it indicates that the designated backup image has been confirmed, so the determination in step S109 is YES, and the process ends.

<8. Ledger Data Restore>

FIG. 11 is a flowchart illustrating a process of recovering the ledger in the data protection area by the data protection area management program. In step S111, restore is performed from the copy (ledger C) including the backup of the ledger A in the data protection area 406 to the ledger volume 407.

Then, in step S112, the ledger A on the data management program is copied back from the backup of the ledger B on the restored ledger volume 407.

Accordingly, it is possible to restore the ledger A of the backup server 10 using the ledger C in the data protection area 406.

<9. Data Restore in Data Protection Area>

Figure 12:
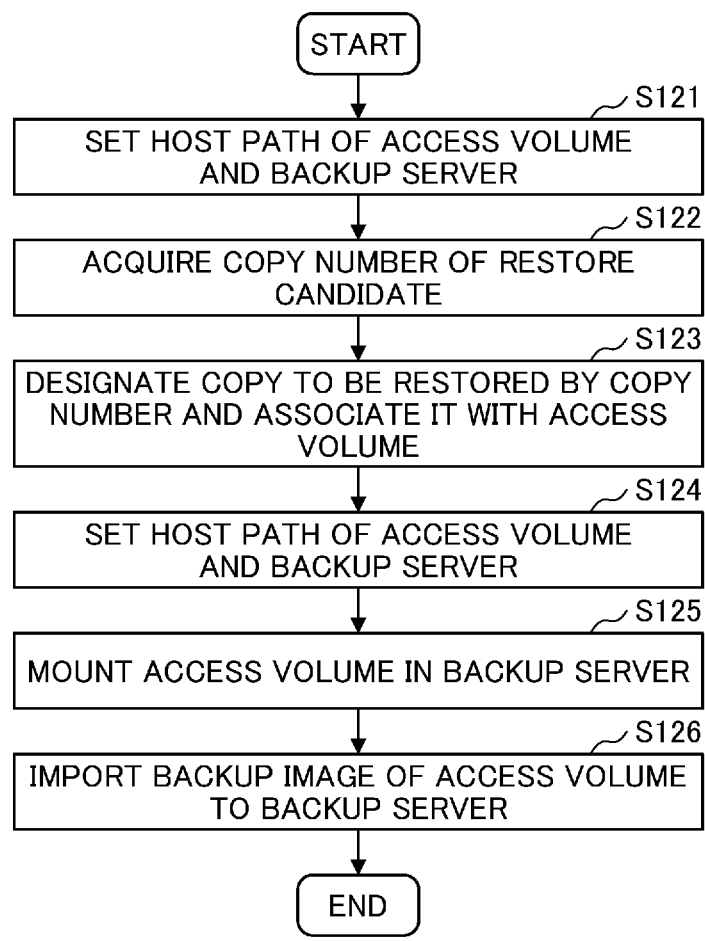
FIG. 12 is a flowchart illustrating a process of making access from a backup server possible using backup data in a data protection area to resume an original operation by a data protection area management program of an embodiment.

FIG. 12 is a flowchart illustrating a process of making access from the backup server 10 possible using the backup data in the data protection area 406 to resume an original operation by the data protection area management program 105 of an embodiment.

First, in step S121, the host path of the access volume and the backup server 10 is set. In step S122, a restore candidate is specified from the check result T33 in the confirmation result table T3, and the copy number T12 corresponding to the backup image ID T13 of the management ledger table T1 is acquired from the corresponding backup image ID T31. Then, the copy to be restored is designated by the copy number and associated with the access volume (step S123). The host path of the access volume 404 and the backup server 10 is set (step S124), the access volume 404 is mounted in the backup server 10 (step S125), and the backup image of the access volume is imported to the backup server 10 (step S126).

Accordingly, the restored image can be provided to the backup server 10 and checked using the data in the data protection area.

By setting the host path of the access volume that stores the confirmed backup image and the business server and mounting the access volume in the business server, it is possible to perform business with the image restored by the business server.

As described above, in the present embodiment, since the data in the data protection area can be accessed via the access volume with the volume ID assigned to the backup image stored in the volume of the data protection area, it is possible to prevent data falsification in the data protection area.

Also, since the volume ID is not assigned to the volume of the data protection area, it is possible to prevent the data falsification in the data protection area.

Further, since it is possible to specify the backup images (generations) in the data protection area associated with the access volume, the administrator can select the generation of the backup images to be restored to the backup server.

Further, although the embodiment in which the backup program 109 on the backup server 10 generates the backup image has been described above, the backup image may be generated using the copy function of the storage system 40 itself.

What is claimed is:

1. A backup system for protecting backup data, the backup system comprising a backup server having a backup management data for managing a copy number and a backup acquisition date and time for each backup image, and a storage system, the storage system comprising:
   a data volume that stores data accessed by a business server;
   a backup image volume that stores a plurality of backup images at different time points of the data volume;
   a primary usage volume that stores an oldest backup image among the plurality of backup images;
   a backup management volume that stores a copy of the backup management data of the backup server;
   an access volume having a volume ID for reading a backup image, of the plurality of backup images, from the backup server; and
   a data protection area including at least one volume having an internal volume ID instead of the volume ID for reading from the backup server,
   wherein the oldest backup image stored in the primary usage volume and an entry including the backup acquisition date and time corresponding to the oldest backup image stored in the primary usage volume in the backup management data stored in the backup management volume are sequentially stored in the volume of the data protection area using the internal volume ID of the volume of the data protection area, and
   wherein the backup image stored in the data protection area and the access volume are associated, and the backup image in the data protection area is provided to the backup server.

2. The backup system according to claim 1, wherein the backup server compares the backup acquisition date and time corresponding to the oldest backup image acquired via the access volume with the backup acquisition date and time corresponding to the oldest backup image of the backup management data managed by the backup server, and checks whether or not the backup management data managed by the backup server has been falsified.

3. The backup system according to claim 2, wherein the backup server compares the backup acquisition date and time corresponding to the oldest backup image acquired via the access volume with the backup acquisition date and time corresponding to the oldest backup image of the backup management data managed by the backup server, and deletes the oldest backup image from the data protection area when the backup acquisition dates and times coincide with each other.

4. The backup system according to claim 2, wherein each entry of the backup management data managed by the backup server is managed in association with the internal volume ID of the volume of the data protection area of the storage system.

5. The backup system according to claim 4, wherein the backup server includes a memory that stores a confirmation result table that stores a result of a virus inspection for each backup image stored in the data protection area.

6. The backup system according to claim 2, wherein the backup server associates the backup image stored in the data protection area with the access volume using the copy number.

* * * * *